United States Patent [19]
Chlebina et al.

[11] Patent Number: 5,827,380
[45] Date of Patent: Oct. 27, 1998

[54] PRECURED TIRE TREAD HAVING SEALING PROJECTION FOR A TRUCK TIRE

[75] Inventors: Lawrence Edward Chlebina, Akron; Gary Edwin Tubb, Copley; Thomas Andrew Laurich, Akron, all of Ohio

[73] Assignee: The Goodyear Tire & Rubber Company, Akron, Ohio

[21] Appl. No.: 978,122

[22] Filed: Nov. 25, 1997

Related U.S. Application Data

[60] Continuation of Ser. No. 642,290, May 3, 1996, abandoned, which is a division of Ser. No. 497,709, Jun. 30, 1995, Pat. No. 5,536,348.

[51] Int. Cl.⁶ .................................................. B60C 13/02
[52] U.S. Cl. ...................... 152/209 R; 152/523; 12/152
[58] Field of Search ........................ 152/209 R, 523, 152/524, 175, 176, 187, 188; D12/152; 156/96, 127, 129, 130.7

[56] References Cited

U.S. PATENT DOCUMENTS

| | | | |
|---|---|---|---|
| D. 124,203 | 12/1940 | Rideout | D12/152 |
| 3,778,203 | 12/1973 | MacMillan | 425/20 |
| 3,867,973 | 2/1975 | Cozzolino et al. | 152/153 |
| 3,868,284 | 2/1975 | Hogan, Sr. et al. | 156/96 |
| 4,053,265 | 10/1977 | Wulker et al. | 425/20 |
| 4,088,521 | 5/1978 | Neal | 156/96 |
| 4,152,186 | 5/1979 | Shibata | 152/523 |
| 4,174,239 | 11/1979 | Symmes | 156/96 |
| 4,230,511 | 10/1980 | Olsen | 156/123 R |
| 4,626,300 | 12/1986 | Barefoot | 156/96 |
| 5,176,764 | 1/1993 | Abbott et al. | 152/158 |
| 5,313,745 | 5/1994 | Mace, Jr. et al. | 51/326 |

FOREIGN PATENT DOCUMENTS

| | | | |
|---|---|---|---|
| 464660 | 1/1992 | European Pat. Off. | 156/129 |
| 2192907 | 7/1973 | France | B26H 17/36 |
| 2821892 | 12/1978 | Germany | B29H 17/37 |
| 72865 | 2/1953 | Netherlands | 152/209 R |
| WO 8904248 | 5/1989 | WIPO | B29D 30/08 |

OTHER PUBLICATIONS

English abstract for JP 3132340, Jun. 1991.
English abstract for JP 2072910, Mar. 1990.
English abstract for JP 2179731, Jul. 1990.

*Primary Examiner*—Geoffrey L. Knable
*Attorney, Agent, or Firm*—David L. King

[57] ABSTRACT

An improved tire 200 having precured tire tread 10 for mounting to an unvulcanized or a vulcanized tire casing 100 is disclosed. The improved precured tread 10 has a pair of circumferentially continuous projections 60. One projection 60 extends axially outwardly from each of the lateral surfaces 40,50 of the tread. The projection 60 provides a means for air tightly sealing the tread casing assembly at the lateral surfaces 40,50 during the vulcanization of the tread 10 to the casing 100. The method of assembly includes placing the tread 10 and casing 100 in a smooth mold, closing the mold inflating a bladder expanding the casing 100 into the tread 10, the tread 10 correspondingly expands effecting an air tight sealing of the tread 10 and the mold at the annular projections 60 of the tread 10, applying heat and pressure causing a uniform flow of unvulcanized material radially outwardly along the tread edges.

3 Claims, 10 Drawing Sheets

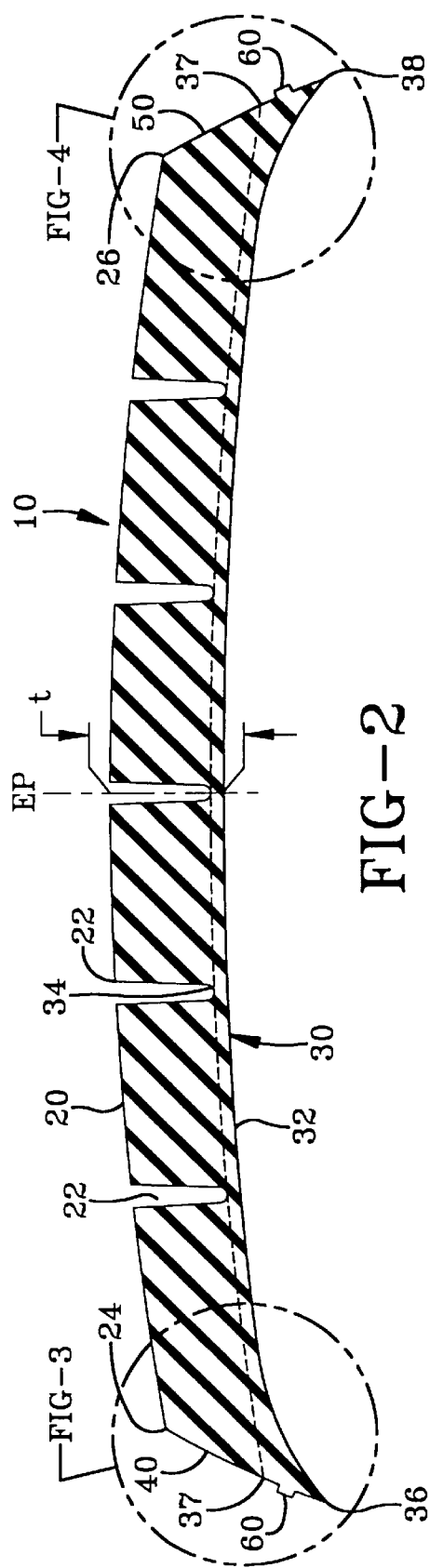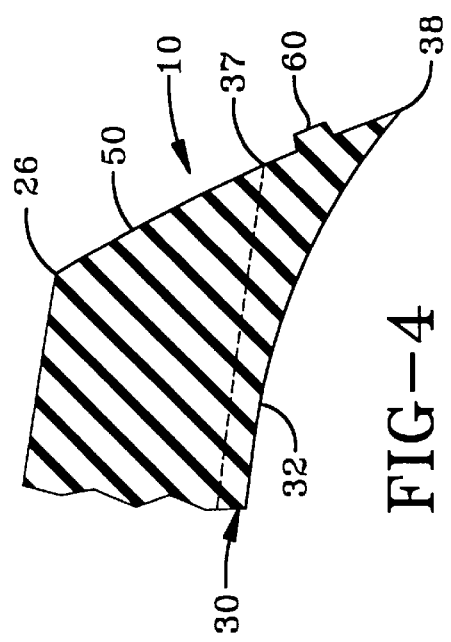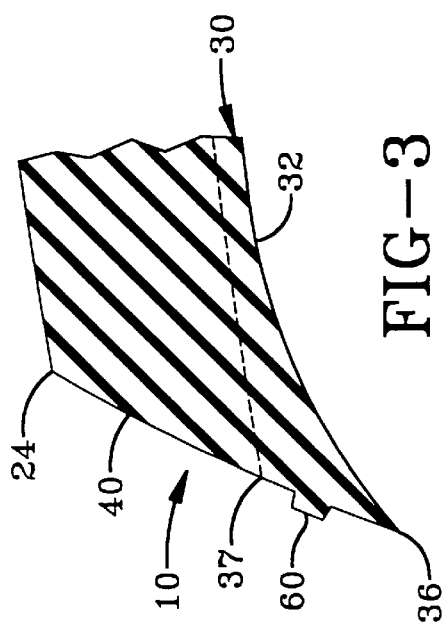

PRECURED TIRE TREAD HAVING SEALING PROJECTION FOR A TRUCK TIRE

This is a continuation of application(s) Ser. No. 08/642,290 (parent) filed on May 3, 1996, now abandoned, which is a divisional of Ser. No. 08/497,709 filed on Jun. 30, 1995, now U.S. Pat. No. 5,536,348.

BACKGROUND OF THE INVENTION

This invention relates to a tire having an improved precured tire tread for mounting to an unvulcanized or a vulcanized tire casing.

Historically the use of precured treads was limited to retreaded tires exclusively. Tire casings are designed to survive several times longer than the tread. This is particularly true of truck tires and low aspect ratio passenger tires.

The Goodyear Tire & Rubber Company in the late 1980's introduced the Unicircle precured injection molded tread. This precured tread is disclosed in European Patent Publication 0-464-660A1. This annular or arcutely shaped tread had short annular wings radially inwardly extending. The wings were flexible and adapted to accommodate casings of various axial widths. This tread introduced high pressure injection molded rubber compounds having excellent wear and rolling resistance properties. Materials used in tread rubber compounds have also been improved making it feasible to transfer compression mold high quality treads for tires which can also achieve excellent wear and performance characteristics.

Later developments efforts were concentrated on improved adhesion of the tread to the casing and in particular at better ways of adhering the wing edge to the casing. On May 24, 1994, U.S. Pat. No. 5,313,745 issued to Carl L Mace, Jr, et al. relating to a tread edge grinding method which effectively created a chamfered edge enabling the cushion gum rubber to migrate over the chamfer effectively locking the annular wing of the pre-cured tread to the cushion gum and the casing.

The advancement in the overall adhesion properties of the tread to casing bond coupled with the ability to meet or surpass the performance of conventional molded new tires means that it is now feasible for new tires to be made using precured treads. One aspect of the present invention describes an improved precured tread and a method for assembling it to a previously unvulcanized casing. A second aspect of the invention teaches how the tread can be applied to a precured new casing or a used prepared vulcanized casing. In each case, the invention permits the adhesion of the tread at the sidewall to exceed that achieved in the Mace patent while at the same time creating an almost imperceptible seam line between the casing and the tread.

SUMMARY OF THE INVENTION

A tire 200 having an improved precured tire tread 10 for mounting to an unvulcanized or a vulcanized-prepared tire casing 100,150 is disclosed. The tread 10 is made from an elastomeric material. The precured tire tread 10 has a radially outer ground engaging surface 20. The tread 10 has grooves 22 extending radially inwardly from the ground engaging surface 20. The tread material radially inwardly of the grooves 22 constitutes an inner tread 30, the inner tread 30 having a radially inner surface 32 and a radially outer surface 34. The tread 10 when in an annular configuration has a cross-section including first and second lateral surfaces 40,50 respectively extending radially inwardly and axially outwardly from an axially outermost point 24,26 on the ground engaging surface 20. The lateral surfaces 40,50 extend radially inwardly to axially outermost and radially innermost points of the inner tread surface, preferably extending a distance less than two times more preferably about equal to or slightly greater than the thickness of the tread 10, the tread thickness being measured at the equatorial plane (EP). The improved tread 10 has a pair of circumferentially continuous projections 60. One projection 60 extending axially outwardly from each of the lateral surfaces 40,50 and being radially outwardly spaced above the intersection 36,38 of the radially inner surface 32 of the inner tread 30 and the lateral surface 40,50. The projection 60 provides a means for air tight sealing the tread casing assembly at the lateral surfaces 40,50 during the vulcanization of the tread 10 to the casing 100. It is preferred that the projection 60 has a uniform cross-sectional shape that is either trapezoidal, semicircular or triangular and that projection be spaced radially about 3 mm preferably less than 15 mm outward of the intersection 36,38 of the radially inner surface 32 of the inner tread 30 and the lateral edge surface 40,50.

The precured tread 10 is best molded to an unvulcanized casing 100 by the method of placing the tread 10 and casing 100 in a smooth mold 70 inserting an inflatable bladder 80 inside the casing 100 then closing the mold 70. The bladder 80 is then inflated expanding the casing 100 firmly into contact with the tread 10, the tread 10 correspondingly expanding firmly engaging the smooth mold 70 and air tightly sealing the tread 10 at the annular projections 60 along the tread edges 40,50. A strip or strips of cushion gum rubber 152 may be applied circumferential around the casing to facilitate bonding the tread to the casing. Additionally, an adhesive 153 can be employed if so desired. Heat and pressure is then applied causing a uniform flow of casing material radially outwardly along the tread edges 40,50 to the annular projection 60.

In the case of attaching a precured annular tread 10 of the present invention to a previously vulcanized casing 150 the method includes the steps of applying a cushion gum layer 152 and an adhesive cement 153 if needed to the prepared casing 150, expanding the tread 10 and positioning the tread 10 onto the casing, transferring the tread onto the casing 150, attaching two shoulder rings 201 to the assembly, the shoulder rings 201 firmly and air tightly sealing the tread 10 at the projection 60 and then forming an annular cavity 202 between the projection 60 and the casing 150, placing the assembly into an autoclave or vulcanizing chamber and applying sufficient heat and pressure to cause a uniform flow of cushion gum material 152 radially outwardly along the tread edges to the annular projection 60. Preferably the annular rings 201 are provided with a means 204 for evacuating entrapped air from the cavity to insure the cushion gum rubber 152 can adequately fill the cavity 202. Additionally, an adhesive cement coating 153 may optionally be applied to the tread 10 or the casing 150 or both to further enhance adhesion.

In the case of applying a precured strip tread 10 of the present invention the above step of expanding the tread 10 is replaced with the step of splicing the tread 10 all other steps being the same as the method of attaching a ring or annular tread as described above.

DEFINITIONS

"Axial" and "axially" means the lines or directions that are parallel to the axis of rotation of the tire.

"Buffed" means a procedure whereby the surface of an elastomeric tread or casing is roughened. The roughening removes oxidized material and permits better bonding.

"Casing" means the carcass, belt structure, beads, sidewalls, and all other components of the tire including layer of unvulcanized rubber to facilitate the assembly of the tread, the tread and undertread being excluded. The casing may be new, unvulcanized rubber or previously vulcanized rubber to be fitted with a new tread.

"Equatorial Plane (EP)" means the plane perpendicular to the tire's axis of rotation and passing through the center of its tread.

"Pneumatic tire" means a laminated mechanical device of generally toroidal shape (usually an open torus) having beads and a tread and made of rubber, chemicals, fabric and steel or other materials. When mounted on the wheel of a motor vehicle, the tire through its tread provides a traction and contains the fluid or gaseous matter, usually air, that sustains the vehicle load. Pre-cured component means a component at least partially vulcanized prior to assembly with other unvulcanized components.

"Radial" and "radially" mean directions radially toward or away from the axis of rotation of the tire.

"Replacement tread" as used herein refers to a premolded and precured tread.

"Retreading" means the procedure of refurbishing a tread worn tire by removing the old tread and replacing it with a precured tread or a "hot capped" tread.

"Tread" means a molded rubber component which, when bonded to a tire casing, includes that portion of the tire which comes into contact with the road when the tire is normally inflated and under normal load.

"Wings" means the radial inward extension of the tread located at axial extremes of the tread, the inner surface of the wing being an extension of the inner casing contacting surface of the tread.

BRIEF DESCRIPTION OF THE DRAWINGS

FIG. 2 is a cross-sectional view of the tread taken along lines 2—2 of FIG. 1.

FIG. 3 is an enlarged partial cross-sectional view of the first lateral edge surface taken from FIG. 2.

FIG. 4 is an enlarged partial cross-section view of the second lateral edge surface taken from FIG. 2.

DETAILED DESCRIPTION OF THE INVENTION

Figure 1:
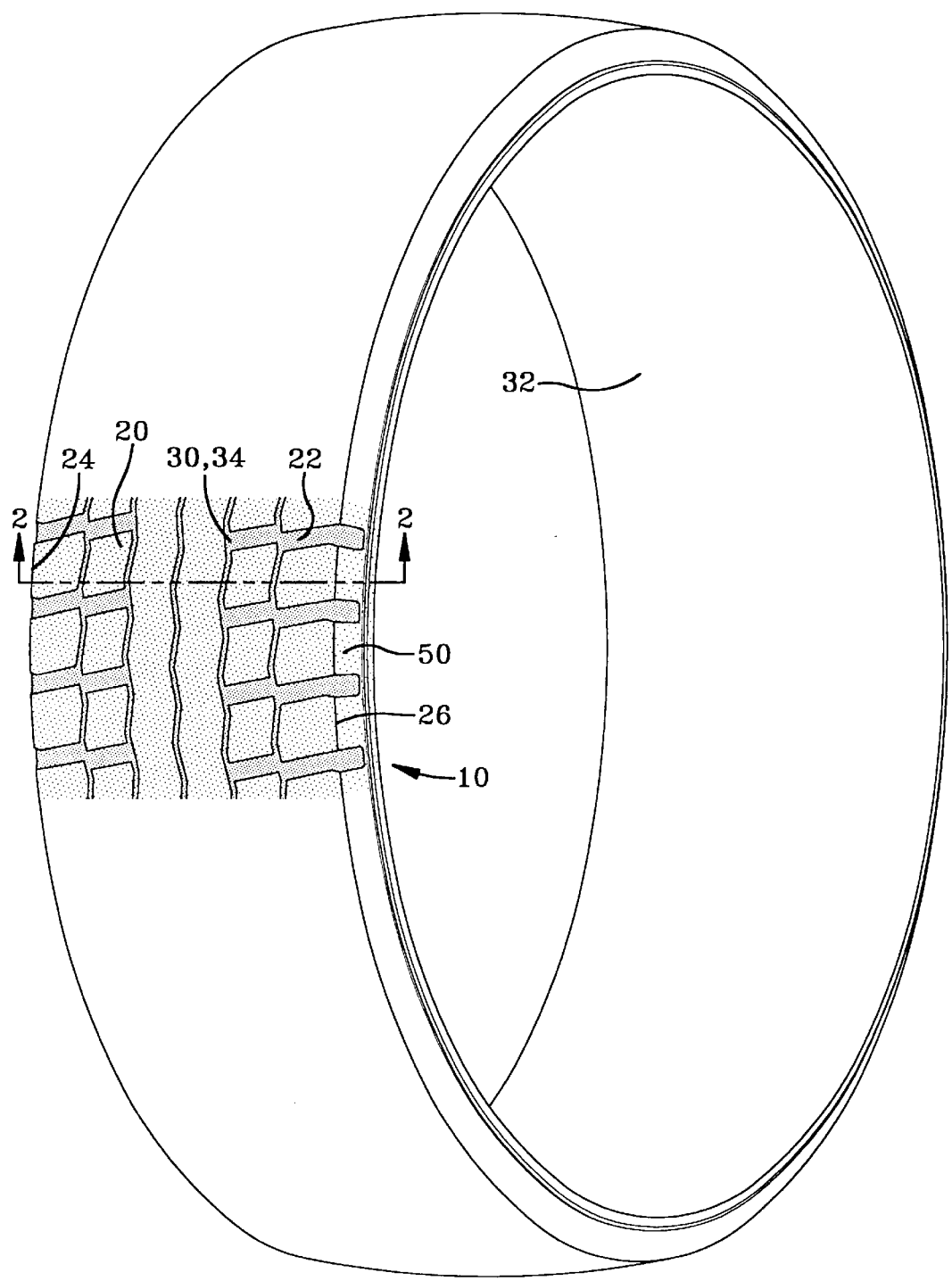
FIG. 1 is a perspective view of the tread according to the present invention in annular form.

With reference to FIG. 1, a perspective view of the tread 10 according to the preferred embodiment of the invention is illustrated. The tread 10 can be compression or injection molded. The tread 10 as shown was manufactured in a spliceless annular ring. Alternatively, the tread 10 can be molded as a flat strip or arcuately formed and when assembled to a casing may have a splice. The elastomeric precured tread 10, when annularly formed, has a radially outer ground engaging surface 20 with grooves 22 extending radially inwardly from the ground engaging surface 20 to an inner tread 30. The inner tread 30 commonly referred to as the undertread has a radially inner surface 32 and a radially outer surface 34.

The tread 10 when in an annular configuration has a first and second lateral surface 40,50 respectively extending radially inwardly and axially outwardly from an axially outermost points 24,26 on the ground engaging surface 20.

Referring to FIGS. 2 and 3. This feature relates to the annular wing portion of the tread as defined as the area between points 37 and 36,38 respectively. It is important to the tire and tread interface durability which lead to improved interfacial durability if tailored to the tire service condition, the tire materials and the tire carcass construction and shape. The lateral surfaces 40,50 extend radially inwardly from the axially outermost point 24,26 of the ground engaging surface 20 to the axially outermost and radially innermost point 36,38 respectively of the inner tread surface 32 a distance less than two times the thickness (t) of the tread and more preferably extend as little as one times the thickness (t) of the tread or just slightly greater than the tread thickness. The tread thickness (t) is measured at the equatorial plane (EP).

The tread 10 has a pair of circumferentially continuous projections 60. As shown in FIGS. 2, 3 and 4, one projection 60 extends axially outwardly from each of the lateral surfaces 40,50. The projections 60 as illustrated are spaced radially outwardly above the intersections 36,38 of the radially inner tread surface 32 and the lateral surface 40,50. As shown, the projection 60 has a trapezoidal cross-sectional shape. Alternatively, the projection 60 can have a uniform semi-circular, oval, square, rectangular, or triangular cross-sectional shape. The projection 60 provides a means for air tightly sealing the tread 10 and casing 100 assembly at the lateral surfaces 40,50 during the vulcanization of the tread 10 to the casing 100. The projection 60 is preferable radially spaced about 3 mm above the intersection 36,38 and preferably less than 15 mm above the intersection 36,38. In order to effect an air tight seal during molding it is important that the projection 60 is positioned radially below any lateral extending grooves 22 in order to effect a seal, therefore, the projection 60 is preferably either radially aligned with or inward of the radially outer surface of the inner tread 32.

To further appreciate the novel features provided by the projection 60 attention is drawn to FIGS. 5 through 10 and the associated processes and methods used in practicing the invention.

Figure 5:
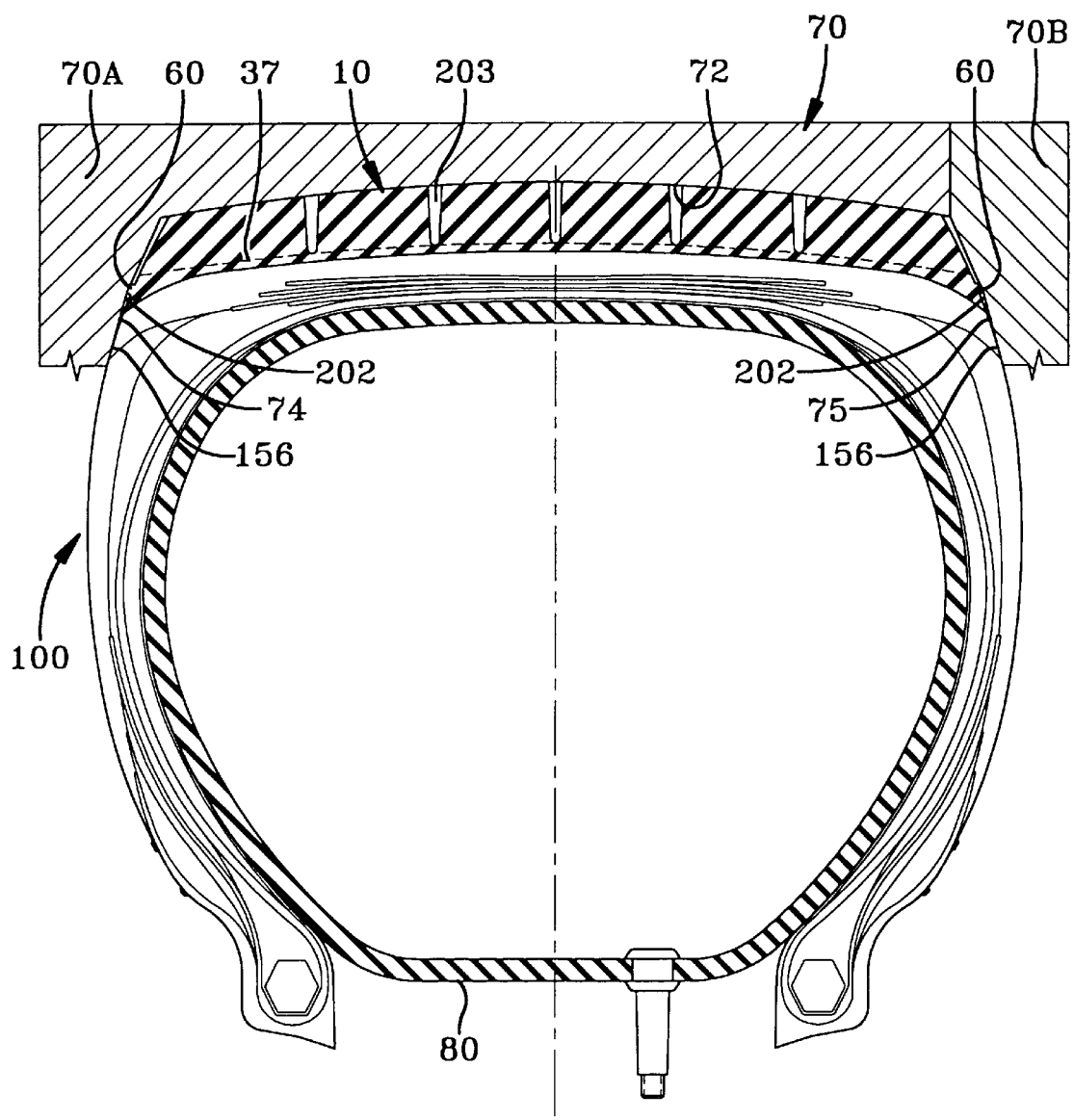
FIG. 5 is a cross-sectional view of the tread being molded to a new tire casing in a smooth mold, only the upper portion of the mold being illustrated for simplicity and clarity.
Figure 8:
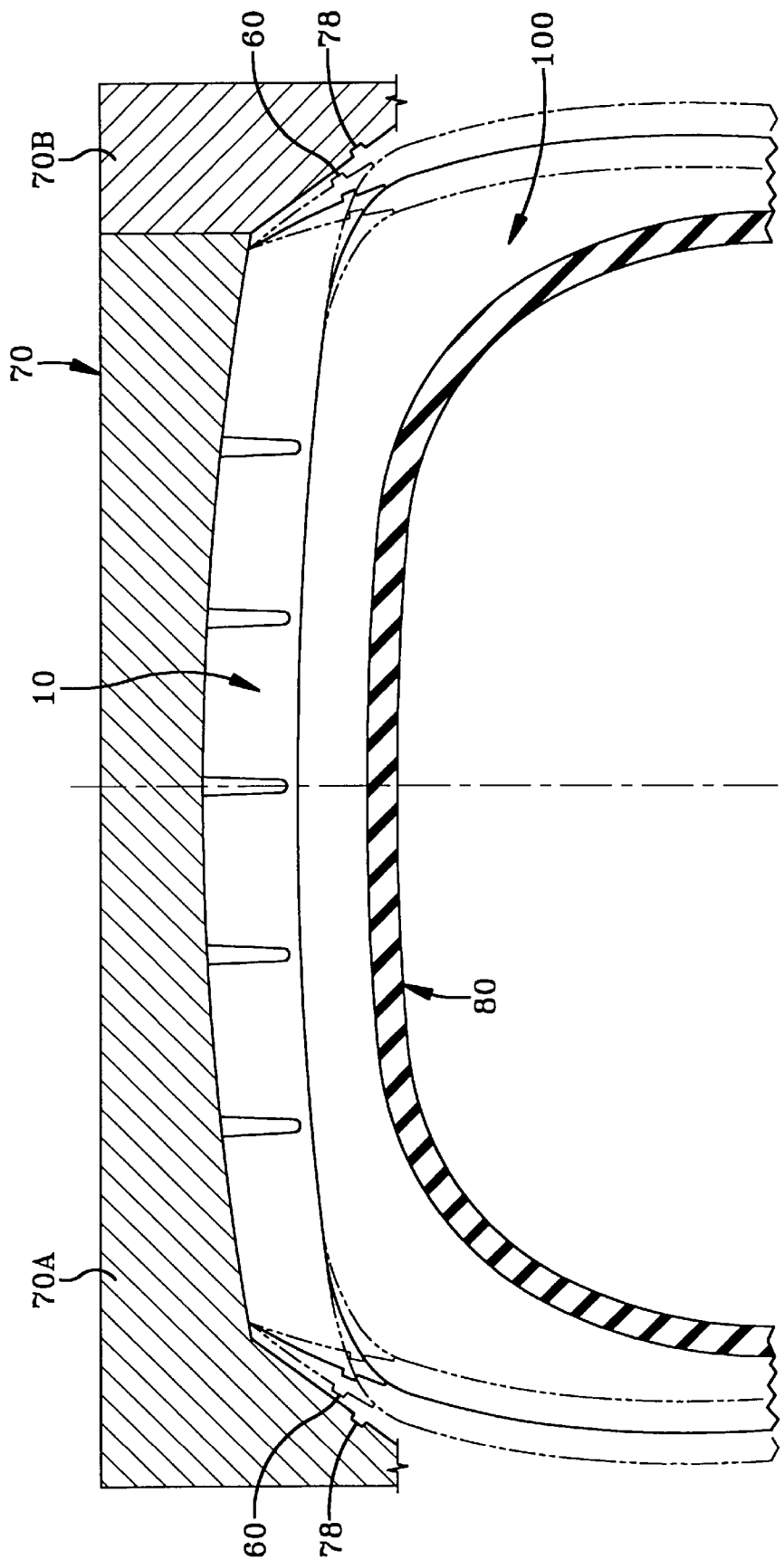
FIG. 8 is a cross-sectional view of a tread being firmly pressed into a smooth mold by the inflation of a bladder which expands the green or unvulcanized casing.

FIG. 5 is a cross-sectional view of a tread 10 attached to a "green" or unvulcanized casing 100 and placed into a smooth mold 70. The smooth mold 70 has no tread pattern. The mold can be split along the circumferential direction at the centerline or anywhere between the centerline and the axially outermost points 24,26 of the ground engaging surface 20 of the tread 10, preferably offset as shown, thus forming two parts 70A and 70B. This facilitates placing the tread and casing into the mold 70. To simplify the drawings, the lower sidewall and bead areas of the mold 70 are not illustrated. These features are functionally the same as is conventionally practiced in the art of tire molding and therefore are accordingly not shown to better facilitate the novel aspects of this molding process. One side of the mold 70B is removed and the casing 100 and tread 10 can be inserted into the mold half 70A. Then, the mold portion 70B is clamped or otherwise attached to the mold half 70A. An inflatable bladder 80 is inserted into the casing 100 prior to closing the mold 70. The green casing 100 preferably has an outside diameter sufficiently small that the annular tread 10 can be easily positioned over the casing 100 without requiring any physical stretching or diametrical expansion of the tread 10. Alternatively, should the tread have a diameter smaller than the casing, for example, at the wing areas between location 37,36,38 respectively, then the tread may be expanded to permit the casing to be inserted inside the tread. Preferably the tread 10 is first positioned into the mold 70 and then the casing 100 and bladder an inflatable or an expandable core 80 are positioned into the mold 70. As shown in FIG. 8, when the mold 70 is closed, the bladder 80 is inflated or the core 80 expanded thereby expanding the casing 100 firmly into contact with the tread 10. As further shown in FIG. 5, the tread 10 correspondingly expands firmly engaging the radially inner surface 72 and the two lateral surfaces 74,75 of the smooth mold 70. At these mold lateral surfaces 74,75 the annular projections 60 press against the mold 70 making an air tight seal. The casing 100 at the shoulder area 156 also engages the mold thus creating a small cavity 202 for the rubber to flow into. This cavity 202 may be vented or evacuated to facilitate material flow as is discussed below.

Figure 9:
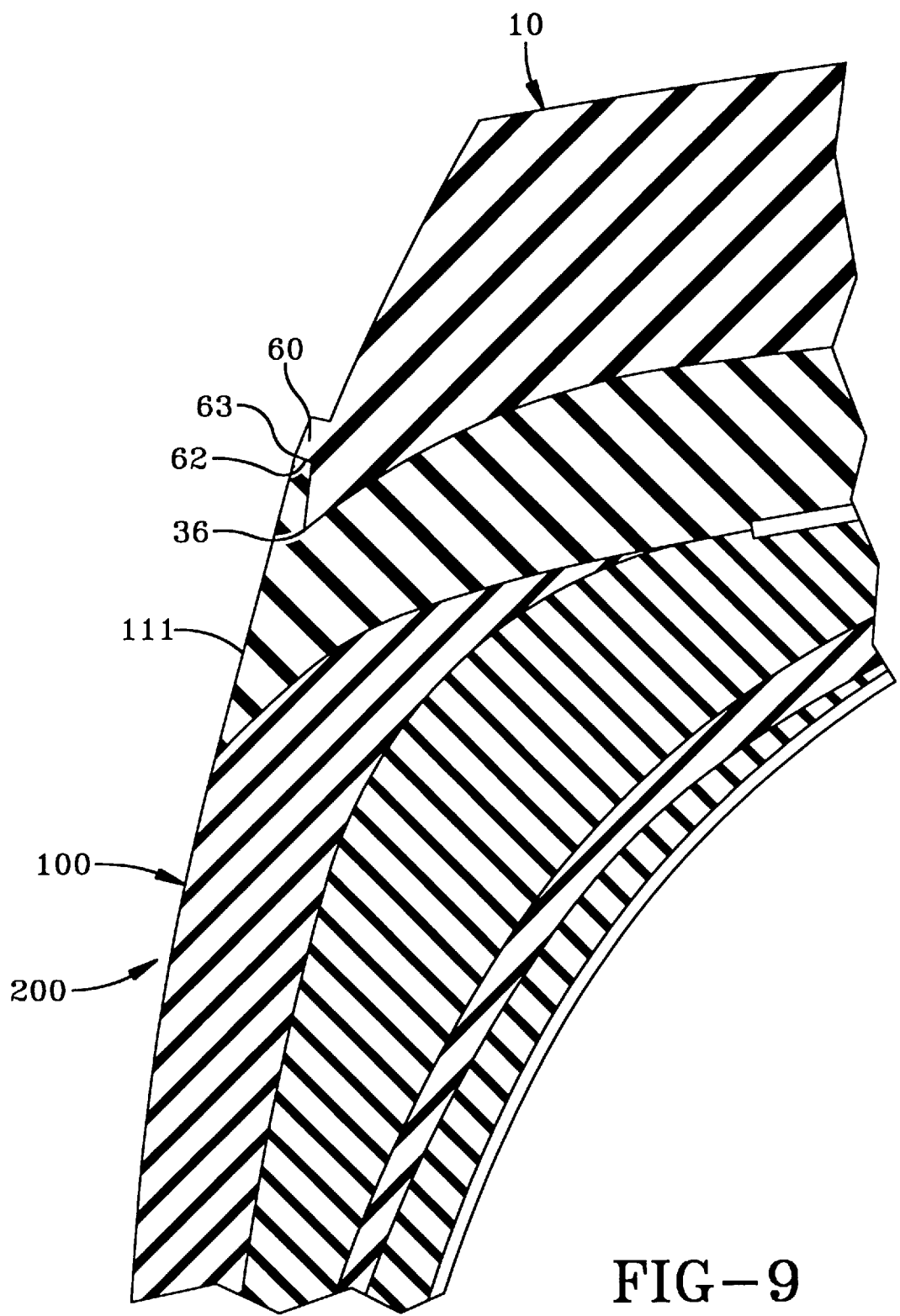
FIG. 9 is a partial cross-section view of the tread and casing after molding.
Figure 9A:
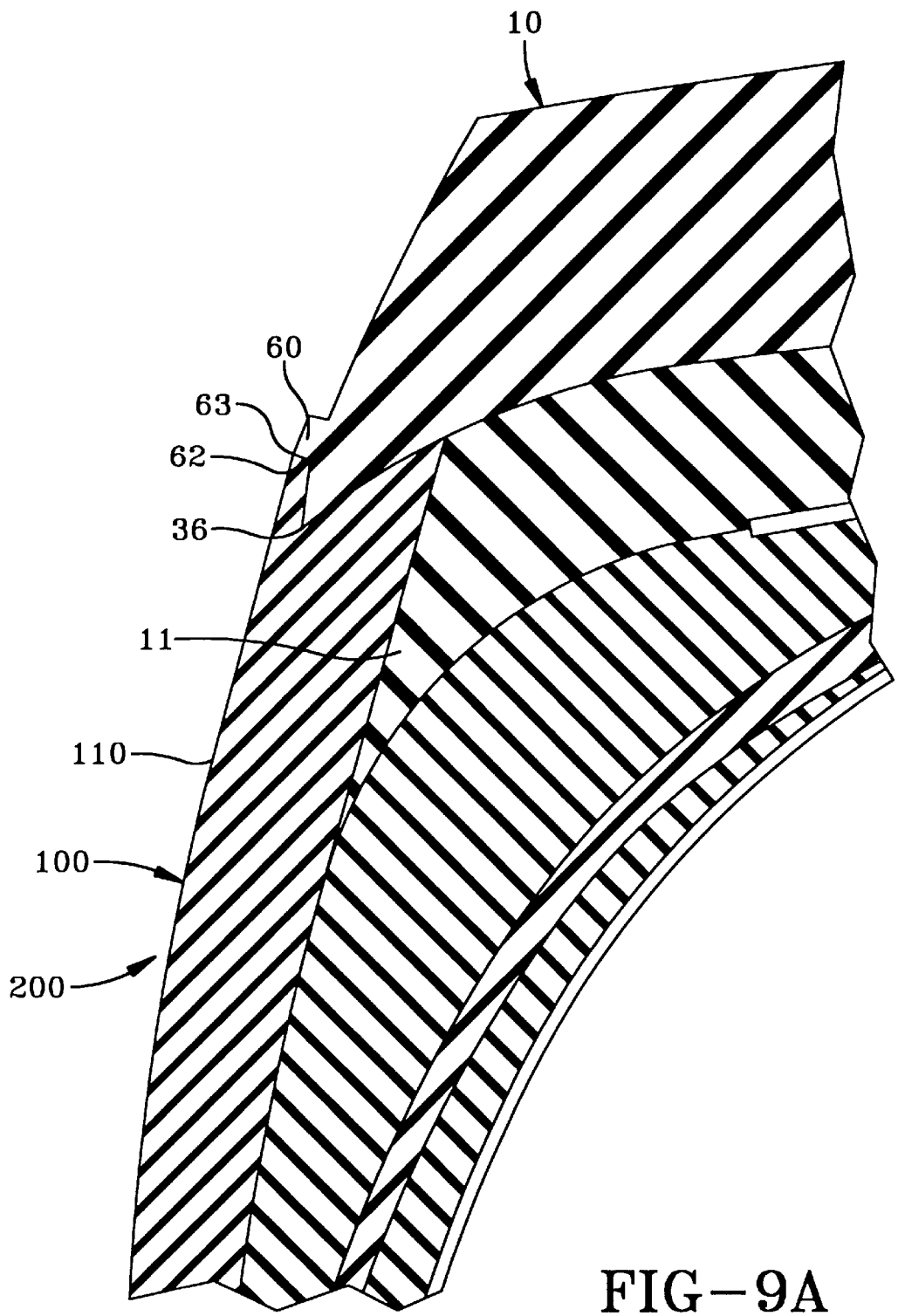
FIG. 9A is a similar view having an alternative casing construction.
Figure 10:
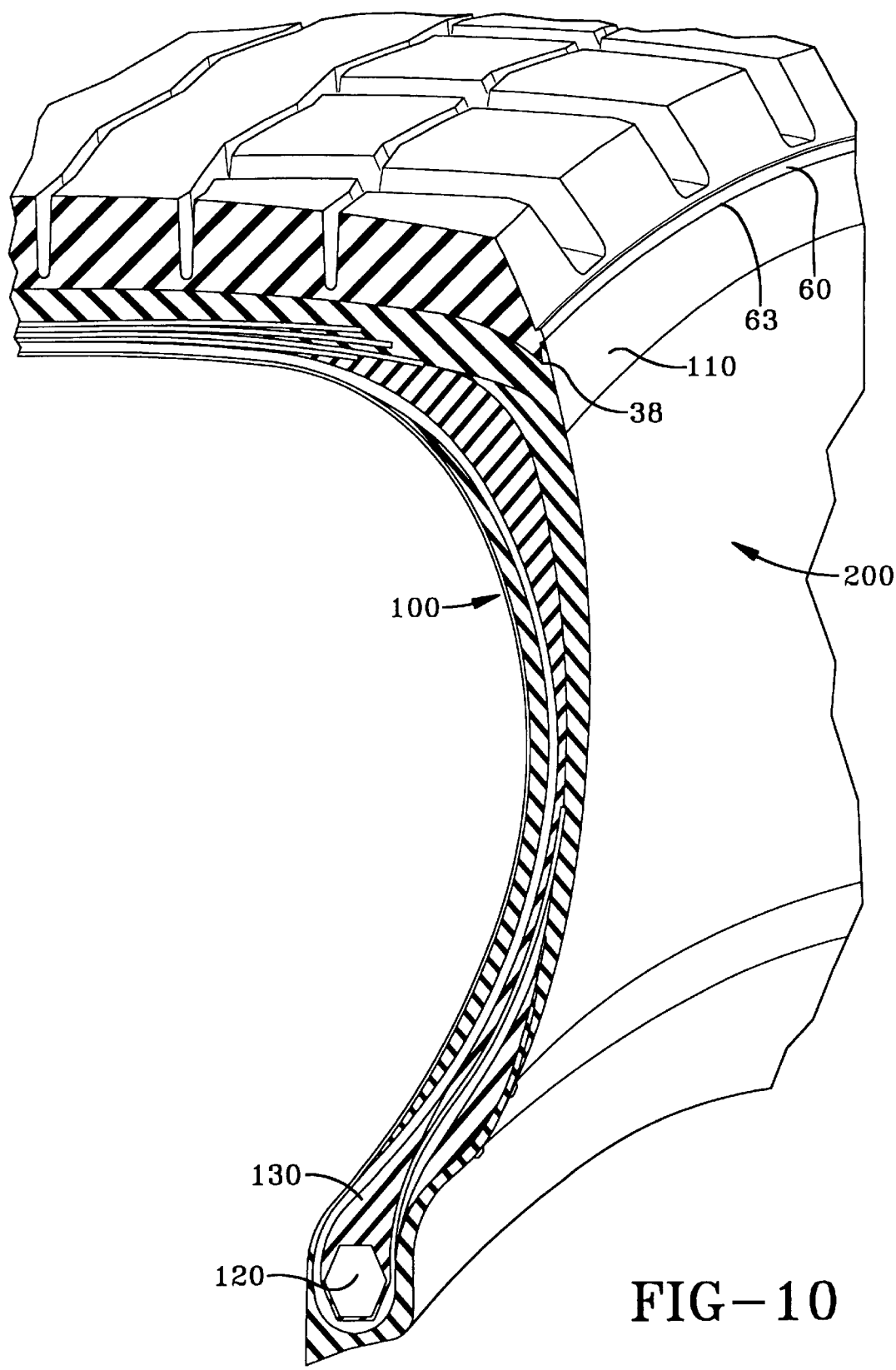
FIG. 10 is an enlarged partial perspective view of the cross-section of FIG. 8 depicting the tire 200 and the tread 10 to casing 100 interface.
Figure 10A:
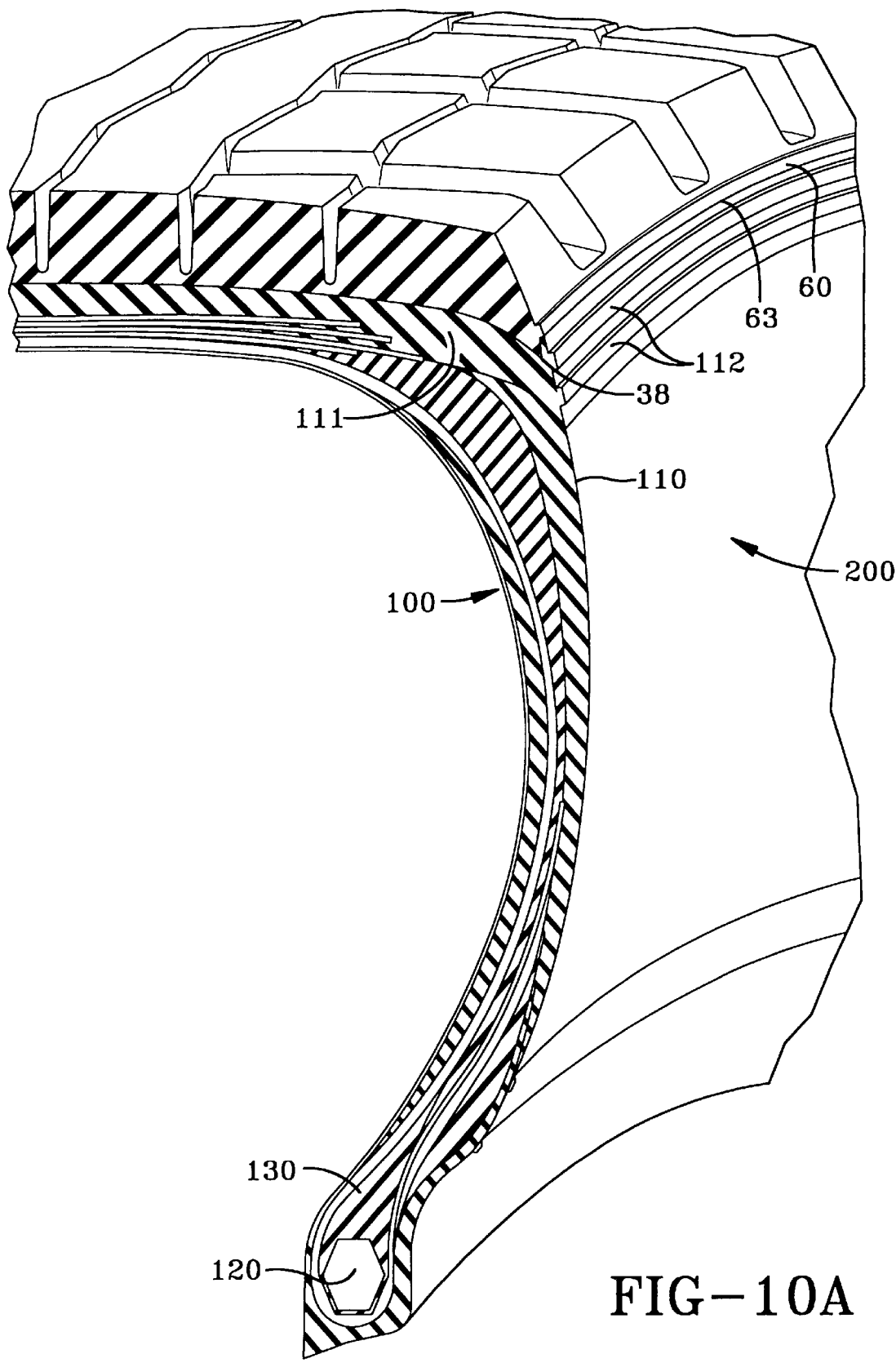
FIG. 10A is a second embodiment similarly shown as in FIG. 10 wherein the casing has the sidewall extended to the tread and further illustrates additional concentric rings.

Heat and pressure is then applied to the mold 70 in the same fashion as the conventional tire vulcanization process. As the green casing 100 heats to vulcanizing temperatures the casing material adjacent the tread edges 36,38 flows. This material flow is as illustrated in FIGS. 9,9A and 10,10A. In FIGS. 9 and 10 the casing 100 has the tread base 111 radially outward and over the sidewall 110. In FIGS. 9A and 10A the casing 100 has the sidewall 110 extending radially to the tread 10 with the base 111 interposed axially between the two sidewalls 110. The tread 10 is effectively encapsulated in the sidewall 110 or the base 111 of the casing 100. The material flow is such that the radially inner surface 62 of the projection 60 acts as a dam preventing rubber flow beyond the projection 60. The resultant tire 200 has an almost imperceptible seam line 63, camouflaged by the annular projection 60. In a preferred embodiment the smooth mold 70 has several concentric rings 78 in the tire shoulder area which upon molding the casing makes several additional concentric rings 112 further masking the joint or seam a further shown in FIGS. 8 and 10A.

Figure 6:
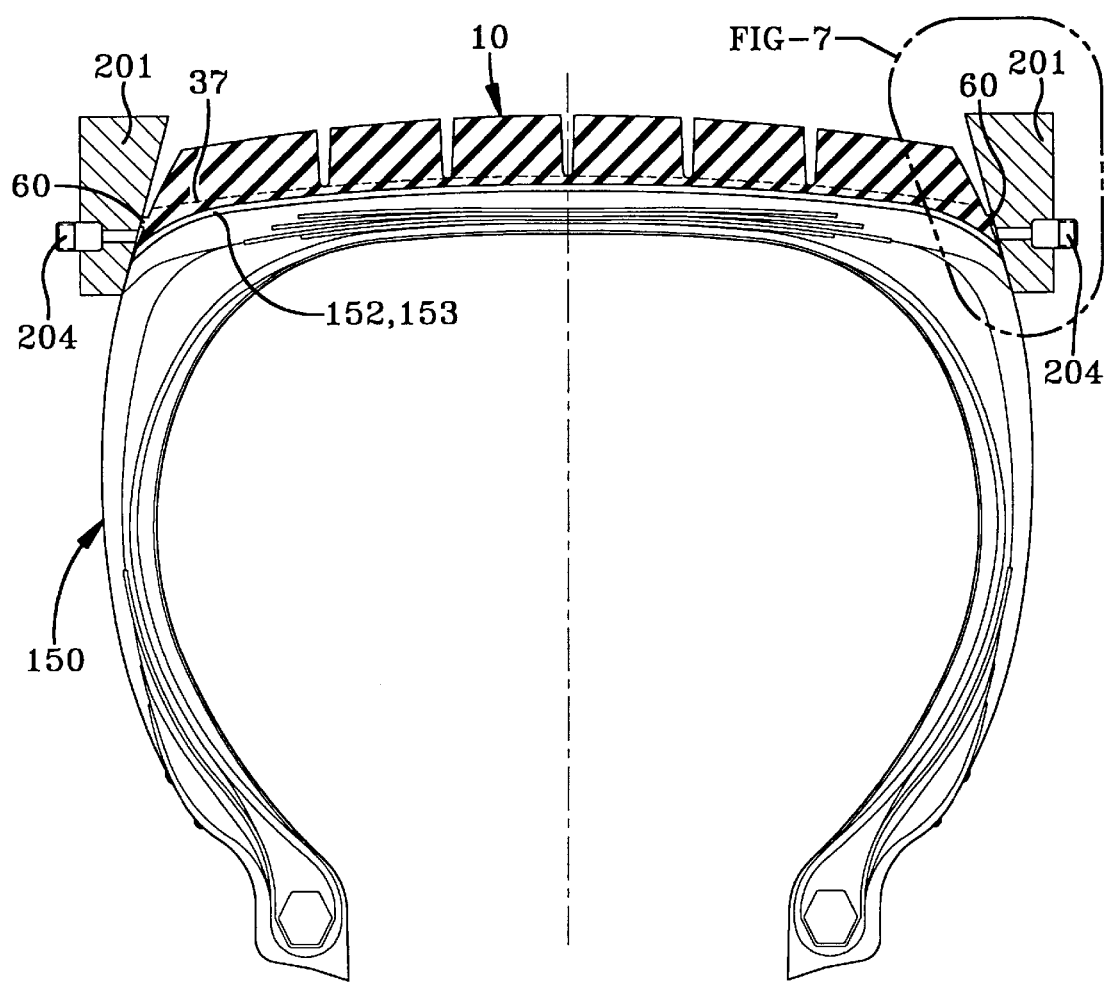
FIG. 6 is a cross-sectional view of the tread being molded to a new or used previously vulcanized tire casing by employing a pair of sealing rings.
Figure 7:
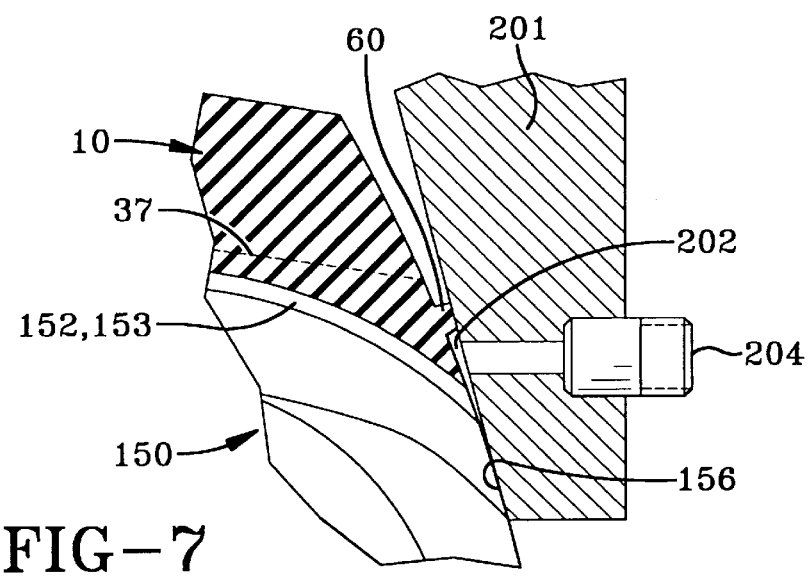
FIG. 7 is an enlarged partial view of the tread and casing taken from FIG. 6.

Referring to FIG. 6 applicants wish to focus the reader's attention to the use of the precured tread in combination with a new or previously used vulcanized casings. In the case of retreading or treading a previously vulcanized casing 150 the tread 10 must either be wrapped about the casing 150 if spliced or stretched expanding the treads inside diameter to fit onto the casing if a spliceless ring tread 10 is employed. Prior to attaching the tread 10 to the casing 150 it is preferred that both the casing 150 and the tread 10 is buffed at the mating surfaces. An adhesive 153 and a cushion gum layer 152 is then applied to the casing 150. The cushion gum layer 152 is cut to a width slightly wider than the tread. A pair of sealing rings 201 are then attached to the tread casing assembly. Each sealing ring 201 firmly engages the continuous projection 60 and the casing shoulder 156 creating a small annular cavity 202 at the tread 10, cushion gum 152, casing 150 interface. The assembly is then placed in a vulcanizing chamber where heat and pressure is applied, softening the cushion gum layer sufficient to cause a flow of rubber into the cavity. Entrapped air in the cavity can be removed by means of evacuating the air via a vent port 204 in each ring 201, the vent port being connected to an air evacuation means (not illustrated). This same feature can be employed on the mold 70 previously discussed. Alternatively, each seal ring 201 can include an inflatable seal or bladder (not illustrated) which is deflated after the seal between the ring 201 and the tread 10 casing 150 assembly is effected. This approach likewise generates a vacuum sufficient to cause the gum rubber 152 to flow to the projection 60 thus permitting the almost imperceptible seam line to be formed as shown in FIGS. 9 and 10.

As an alternative method of molding the tread to the casing it will be appreciated by those of ordinary skill in the art that the annular projections 60 of the tread 10 could alternatively be located on the mold 70. In such a configuration, the mold 70 at each lateral surface 74 and 75 would include at least one annular projection similar to the cross sectional shape of those shown on the tread 10. This alternative design would similarly form the cavity 202 which may be vented or evacuated to permit material flow as discussed above. The resultant flow would yield a molded ring of cushion gum or casing material to be formed around the precured tread 10 effectively locking the tread edge 36,38 to the casing 100 or 150.

A significant advantage of the process as disclosed is a dramatic reduction in cure time. The precured tread 10 needs no additional curing therefore the entire molding process only is required to vulcanize the casing 100. The casing 100 being relatively thin can rapidly be brought to vulcanizing temperatures cured and finished in about one-half of the time required to cure a traditional tire having a green tread and casing. The precured tread 10 can be injection molded in less than three minutes. Alternatively, the tread can be precured using a slower compression molding process. The combination of precured tread 10 and a precured casing can be molded in a smooth mold in less than half the time required to conventional cure an unvulcanized tire. The rapid molding is achieved when the tread is maintained at temperatures of about 200° F. or above just prior to molding the finished tire. The same tire conventionally processed requires about 40 minutes to cure.

Figure 11A:
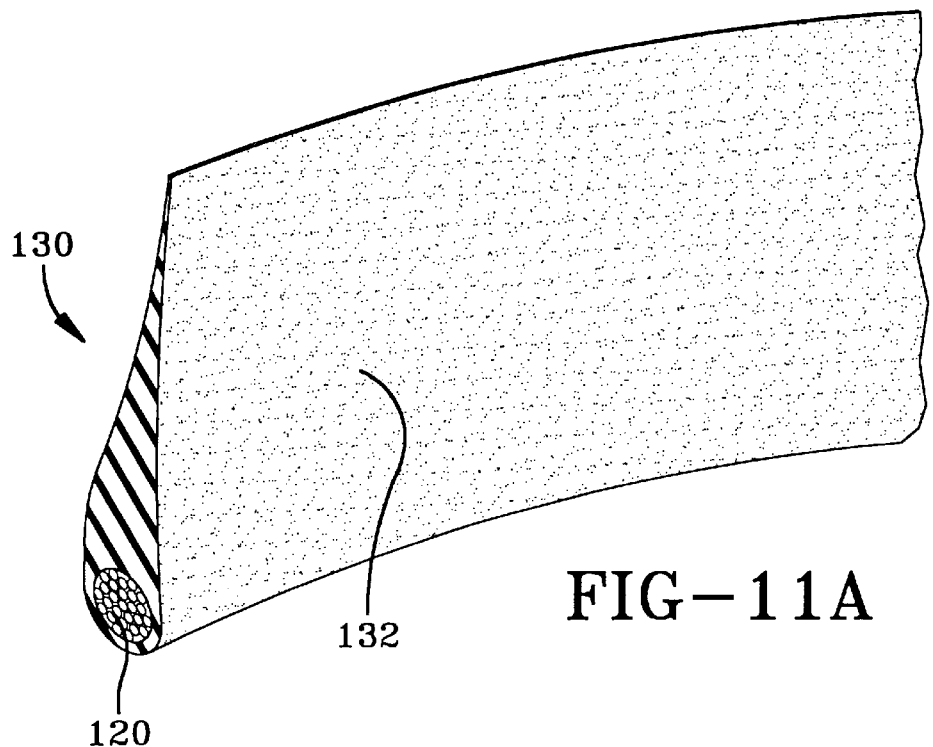
FIGS. 11A and 11B are partial perspective views of the textured precured apex.
Figure 11B:
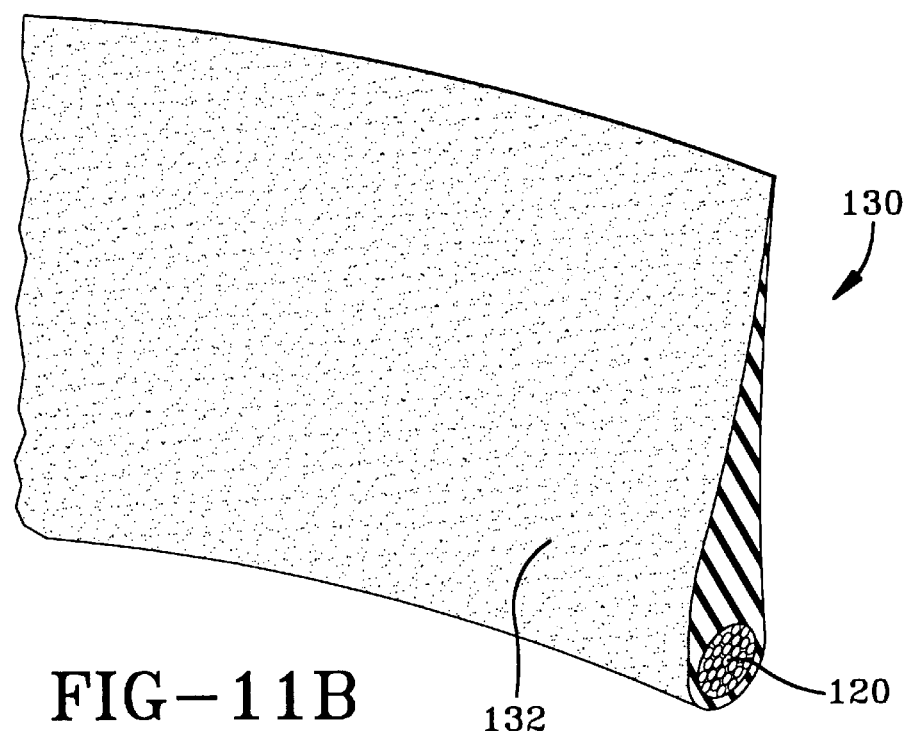

The inventors have found that the invention can best be practiced employing a primarily green or otherwise unvulcanized casing 100 having a bead core 120 encapsulated in a precured annular apex 130. The bead core 120 and precured apex 130 subassembly are preferably manufactured using an injection molding process wherein the elastomeric apex 130 is injection molded simultaneously encapsulating the bead core 120. Alternatively, a compression molded apex bead assembly is also feasible. As shown in FIGS. 11A and 11B, the apex 130 may have finely roughened textured outer surfaces 132 which can enhance the adhesion surface area between the unvulcanized components of the casing 10 and the precured apex 130 in some tire constructions. The combination of a precured tread 10 with a substantially unvulcanized casing 100, except for the precured apex and the bead subassembly 130, achieves excellent adhesion properties under rapid curing cycles. The heat transfer requirements of the tread-casing assembly are reduced by reducing the thickest portions of uncured rubber in the casing 100.

A second benefit to rapid manufacturing time is cost. By molding tires at 2 to 3 times the speed of conventional procedures means that only ½ or less molds and mold machines are needed to supply the tire production demand. These costs can add up to millions of dollars in capital savings for production of new tires. The molding of the tread 10 prior to inserting the tread 10 and casing 100 into the mold 70 eliminates the distortions that are created when the conventional mold with a radially inwardly extending tread groove pattern is pressed against the slab of uncured tread rubber. This pushing of the mold tread face against the uncured tire causes the belts to distort and as the uncured rubber of the tread flows to form a grooved tread pattern, the distorted belts indiscriminately can effect the radial location of the grooves and the lugs. This results in a non-uniform tread base compound thickness. The tires 200 when manufactured with uncured casings 100 according to the present invention can be built to the cured dimension and shape of the precured tread 10. This eliminates the distortions commonly found in new conventionally molded tires thus greatly improving tire uniformity. The tread base often times is selected to provide reduced rolling resistance. Non-uniformities in thickness can adversely reduce the beneficial use of the base compound. When a conventionally molded tire is removed from the mold and mounted and inflated on a wheel, the belts conform under tension or stretch causing the lugs or tread elements to be radially high and low due to these non-uniformities in thickness. This high-low dimensional discrepancy can induce irregular wear problems. All of these detrimental conditions can be eliminated by the use of precured treads employed in smooth molds.

Another benefit of the sealing of the tread projections 60 against the mold faces 74,75 means that the air space 202 between the tread 10 and the mold 70 can be evacuated or pressurized during mold curing this can greatly enhance the uniformity of molded tire as well.

The methods and apparatus for the new tire and retreaded tire yield the added benefit of having a retreaded tire that is virtually identical in appearance to the original new tire, both tires having the tread edge at the casing interface totally encapsulated in rubber, effectively locking this portion of the tread to the casing. New tires made according to the present invention have been tested with no evidence of tread edge separation.

Another significant advantage to this invention is that the dimensional accuracy of the precured components permits the overall tire component tolerances to be tightened. This enables the tire to be built to tighter tolerances using less material. These tighter tolerances naturally improve tire uniformity and overall tire performance.

What is claimed is:

1. In a precured tire tread for annular mounting to an unvulcanized or a vulcanized prepared tire casing, the tread being made from an elastomeric material, the precured tire tread having a radially outer ground engaging surface, the tread having grooves extending radially inwardly from the ground engaging surface, the tread material radially inwardly of the grooves constituting an inner tread, the inner tread having a radially inner surface and a radially outer surface, the tread when in an annular configuration having a cross-section including first and second lateral surfaces respectively extending radially inwardly and axially outwardly from axially outermost points on the ground engaging surface to axially outermost and radially innermost points of the inner tread surface a distance of less than two times the thickness of the tread, the tread thickness being defined as measured at the equatorial plane, the improvement comprising;

a pair of circumferentially continuous projections, one projection extending axially outwardly from each of the first and second lateral surfaces and being radially outwardly spaced in proximity to and generally above the intersection of the radially inner tread surface and the first or second lateral surface at a distance of about 3 mm, each projection having a radially inner surface providing a means for air tightly sealing the tread-casing assembly at each of the lateral surfaces during the vulcanization of the tread to the casing, when the tread is placed in contact with a surface of a mold, the radially inner surface of each projection and that portion of the first and second lateral surfaces located between the projection and the intersection and the surface of the mold forming a cavity for the flow of unvulcanized rubber from the casing to extend axially outward of the first or second lateral surface and radially up to the radially inner surface of the projection, the flow of unvulcanized rubber effectively encapsulating the tread and creating an imperceptible seam line at the radial inner surface of the projection.

2. The improved precured tire tread of claim 1 wherein each projection has a cross-sectional trapezoidal shape.

3. The improved precured tire tread of claim 1 wherein each projection has a cross-sectional semi-circular shape.

* * * * *